US006614852B1

(12) United States Patent
Laurent

(10) Patent No.: US 6,614,852 B1
(45) Date of Patent: Sep. 2, 2003

(54) SYSTEM FOR THE ESTIMATION OF THE COMPLEX GAIN OF A TRANSMISSION CHANNEL

(75) Inventor: Pierre-André Laurent, Bessancourt (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/512,467

(22) Filed: Feb. 24, 2000

(30) Foreign Application Priority Data

Feb. 26, 1999 (FR) .............................. 99 02440

(51) Int. Cl.[7] .......................... H04L 27/02; H04L 5/12; H04L 23/02; H04L 27/10; H04C 5/00
(52) U.S. Cl. ..................... 375/268; 375/264; 375/275
(58) Field of Search ................. 375/268, 364, 375/275; 370/335

(56) References Cited

U.S. PATENT DOCUMENTS

| 4,027,261 A | 5/1977 | Laurent et al. ............... 327/98 |
| 4,382,232 A | 5/1983 | Laurent ....................... 329/303 |
| 4,603,393 A | 7/1986 | Laurent et al. ............. 329/306 |
| 4,799,241 A | 1/1989 | Laurent ....................... 375/364 |
| 4,852,098 A | 7/1989 | Brechard et al. ........... 714/782 |
| 4,888,778 A | 12/1989 | Brechard et al. ........... 714/755 |
| 4,905,256 A | 2/1990 | Laurent ....................... 375/275 |
| 4,945,312 A | 7/1990 | Auger et al. ................ 329/345 |
| 4,982,341 A | 1/1991 | Laurent ....................... 704/250 |
| 5,016,278 A | 5/1991 | Rochette et al. ............ 365/200 |
| 5,243,685 A | 9/1993 | Laurent ....................... 704/200 |
| 5,313,553 A * | 5/1994 | Laurent ....................... 395/2.16 |
| 5,412,686 A * | 5/1995 | Ling ........................... 375/200 |
| 5,522,009 A | 5/1996 | Laurent ....................... 704/222 |
| 5,651,091 A * | 7/1997 | Chen .......................... 395/2.32 |
| 5,680,507 A * | 10/1997 | Chen .......................... 395/2.32 |
| 5,712,877 A * | 1/1998 | Ho et al. ..................... 375/284 |
| 5,745,871 A * | 4/1998 | Chen |
| 5,819,215 A * | 10/1998 | Dobson et al. ............. 704/230 |
| 5,867,478 A * | 2/1999 | Braum et al. ............... 370/203 |
| 6,016,469 A | 1/2000 | Laurent ....................... 704/222 |

FOREIGN PATENT DOCUMENTS

| EP | 0 887 977 A2 | 12/1998 |
| GB | 2 247 812 A | 3/1992 |
| JP | WO 96/13910 | 5/1996 |
| JP | 08149176 | 6/1996 |

OTHER PUBLICATIONS

Khansari et al (Convolution Interpolative Coding Algorithms, IEEE 1992, pp. 209–218.*

* cited by examiner

Primary Examiner—Mohammad H. Ghayour
Assistant Examiner—Tony Al-Beshrawi
(74) Attorney, Agent, or Firm—Oblon, Spivak, McClelland, Maier & Neustadt, P.C.

(57) ABSTRACT

A system for the estimation of the complex gain of a transmission channel is designed for parallel type modulators/demodulators that can be used in digital radio broadcasting. The system includes a given number N of sets of interpolators to estimate the gain on a useful symbol from known symbols constituting gain references evenly positioned in the transmitted signal, each set of interpolators being adapted to a particular situation of reception, ranging from a stable single-path channel to a channel with high temporal dispersion and high instability. The outputs of the interpolators are coupled to a selection device programmed to choose the set of interpolators that gives the weakest estimated noise during a specified length of time. Such a system may find application to digital radio transmission.

8 Claims, 2 Drawing Sheets

SYSTEM FOR THE ESTIMATION OF THE COMPLEX GAIN OF A TRANSMISSION CHANNEL

BACKGROUND OF THE INVENTION

Field of the Invention

The present invention relates to a system for estimating the complex gain of a transmission channel.

It can be applied especially to the field of digital radio broadcasting using parallel modulators/demodulators in long-wave, medium-wave and short-wave bands that are amplitude-modulated.

DISCUSSION OF THE BACKGROUND

The methods that give the best trade-off between cost and efficiency are based on the use of a parallel modulator/demodulator that is often described as the juxtaposition of a large number N of several hundreds of elementary modulators/demodulators with a low bit rate of a some tens of bits per second, each being locked into its own center frequency. These center frequencies are as close to each other as possible so that the bit rate of the transmitted information is the maximum in the frequency band allotted to the transmitter.

For example, according to the present standards of radio broadcasting, a parallel modulator/demodulator should be capable of working within a total band of 9 kHz comprising 288 carriers spaced out at intervals of 31,25 Hz, each carrier being modulated independently of its neighbors, the carriers being synchronous with one another.

When the transmission channel is unstable, especially in the short waves, it is essential to be able to follow its variations and therefore to estimate its complex gain in amplitude and phase at any point in time and on every carrier so as to be able to use a method of demodulation known as coherent demodulation. This method of coherent demodulation enables the optimum exploitation of high spectral efficiency multi-state modulations, namely modulations characterized by a large number of bits/s transmitted per Hz of occupied band.

The complex gain of the channel is usually estimated by inserting symbols of known amplitudes and phases according to a predetermined regular pattern. These symbols are also called "gain reference" symbols. They represent the smallest possible proportion of the totality of the transmitted symbols in order to maximize the useful bit rate.

The complex gain of the channel at any point in time and on any frequency can then be estimated by a method of interpolation that uses the gains measured on the gain references to compute the gain of the channel at the desired position.

The method is comparable to that of a filtering operation, and consists in computing a weighted sum of the gain references close to the cell considered.

A first known approach consists in carrying out a temporal interpolation followed by a frequency interpolation. Two steps are then necessary.

The first step consists of the estimation, by interpolation, of the complex gain of the channel on a specified symbol of each of the carriers from the gain references located in the past and the future. This interpolation is done by a linear combination of a specified number Kt of gain references.

The second step consists of a filtering operation done along the frequency axis by means of a transversal filter in order to improve the estimation. All the gains estimated at a given point in time on the carriers close to a given carrier are combined with the gain estimated on this carrier in order to improve the signal-to-noise ratio. This interpolation takes place on Kf carriers.

In the first approach, N is the number of carriers, and the complexity of the set resulting therefrom is proportional to $N \times Kt + Nkf = N(Kt + Kf)$.

A second approach consists in carrying out a 2D interpolation. In this case, the estimation takes place in only one step, and is the result of a combination of temporal interpolation and frequency interpolation. The gain estimated at a given point in time on a carrier under examination is a linear combination of the gains of the gain references that are present in the past, present and future of the point in time considered, on the carrier examined and the carriers in its neighborhood.

To obtain levels of performance close to those of the first approach, it is necessary to consider slightly less than $Kt \times Kf$ gain references at each interpolation in keeping only those that are "the most correlated" with the gain to be estimated, which is equivalent to a complexity of about $\frac{3}{4} \times N \times Kt \times Kf$.

A third approach consists in "making a projection on eigen-vectors. In this case, the received signal is deemed to result from the sum of R replicas of the original signal transmitted on a multipath channel. All the gains of the channel considered at a given point in time and on N carriers may be reduced to a gain vector that is the sum of the following vectors: R slowly evolving (narrow-band) vectors that are decorrelated in varying degrees and a random noise vector.

The method used consists in computing the autocorrelation of the gains along the frequency axis, forming a matrix that has these autocorrelations as coefficients, finding its eigen-values and keeping the R eigen-vectors that correspond to the R paths.

The vector of the gains is then projected on these eigen-vectors and the projection is considered to be the totality of the smoothened gains rid of the noise.

The complexity of this method corresponds to the computation of the N autocorrelations, followed by the computation of the eigen-values of a matrix with a size $N \times N$. In other words, the complexity is very great.

Finally a fourth approach implements a method of adaptive filtering that uses one of the two methods of interpolation, namely temporal interpolation followed by frequency interpolation or 2D interpolation, and that varies the coefficients of the interpolator filters in the course of time according to well-known mathematical methods such as the gradient algorithm, the simplified gradient algorithm, the sign algorithm, or even the method in which the same computation is repeated at regular intervals. In this case the degree of complexity is between that of the fixed interpolation method and that of the projection method. It entails risks of instability in channels that are-highly disturbed as is the case with the HF short-wave band.

SUMMARY OF THE INVENTION

The goal of the invention is to provide an sub-optimal approach that seeks to obtain levels of performance comparable to those of the most cumbersome methods referred to here above. At the same time, it seeks to obtain a method of very low complexity. This is an indispensable condition if the receiver is to have an acceptable cost of acquisition and use, given that the channel is not always disturbed in the same way. The reception conditions of the various broadcasting stations that can be received at a given point in time are indeed highly variable. Some stations come in "loud and clear", while others are affected by noise and distortion. Thus, it would seem obvious that the work to be done by the channel estimator of the receiver will not be the same in both cases.

Worse still, it can be seen that an interpolator adapted to a disturbed channel lowers the quality of the performance on a high quality channel. This can be explained by considering the interpolator to be behaving like a low-pass smoothing filter that must be broad when the channel is unstable and rather narrow when the channel is stable. Should the filter be adapted to an unstable channel while the channel is stable, then this filter will receive excessive noise in addition to the useful signal represented by the gain references received. If, on the contrary, the filter is adapted to a stable channel while the channel undergoes quick change, then it will become impossible to follow its changes so that, if there is little noise, the channel will be badly estimated and the quality of the estimator will be poor.

It is thus advisable, at all times, to have interpolators sufficiently adapted to the current situation which depends on the time and on the station from which reception is being made. In this case, the performance could be of lower quality than in the case of the optimal interpolators but sufficient for the deterioration to go unnoticed.

To this end, another object of the invention is a system for the estimation of the complex gain of a transmission channel designed for parallel type modulators/demodulators that can be used in digital radio broadcasting, the system comprising a given number N of sets of interpolators to estimate the gain on a useful symbol from known symbols constituting gain references evenly positioned in the transmitted signal, each set of interpolators being adapted to a particular situation of reception, ranging from a stable single-path channel to a channel with high temporal dispersion and high instability, the outputs of said interpolators being coupled to a selection device programmed to choose the set of interpolators that gives the weakest estimated noise during a specified length of time.

The invention has the advantage of great simplicity of implementation, the algorithms used for the computation of the selection criteria being similar to those normally necessary to carry out a demodulation. The increase in the computing power necessary is low because the selection criteria are computed only on the gain references. The invention also has the advantage of proposing lower-cost adaptation to extremely variable conditions of reception. Finally it makes it possible to obtain quasi-optimality, namely little deterioration of performance as compared with the performance that can be obtained with a constantly optimal system.

BRIEF DESCRIPTION OF THE DRAWINGS

Other characteristics and advantages of the invention shall appear from the following description, made with reference to the appended drawings, of which.

DETAILED DESCRIPTION OF THE PREFERRED EMBODIMENTS

The solution proposed by the invention consists of the use of several sets of interpolators, each adapted to a given situation, each situation being itself characterized by a Doppler spread that corresponds to the speed to which the channel is evolving and a "temporal spread" that corresponds to the shift between the two replicas of the original signal that reach the receiver at the earliest possible time and at the latest possible time. The more quickly the channel evolves, the greater the Doppler spread. The temporal spread is a measure of the dispersion of the transmission channel.

Each set of interpolators estimates the channel gain on one or more carriers from the gain references transmitted on these carriers.

A selection criterion is associated with each set of interpolators. The nth criterion is the estimation of the mean interpolation error that can be obtained by using the nth set of interpolators. If n is a minimum, it is logically the nth set of to interpolators that must be used.

Figure 1:
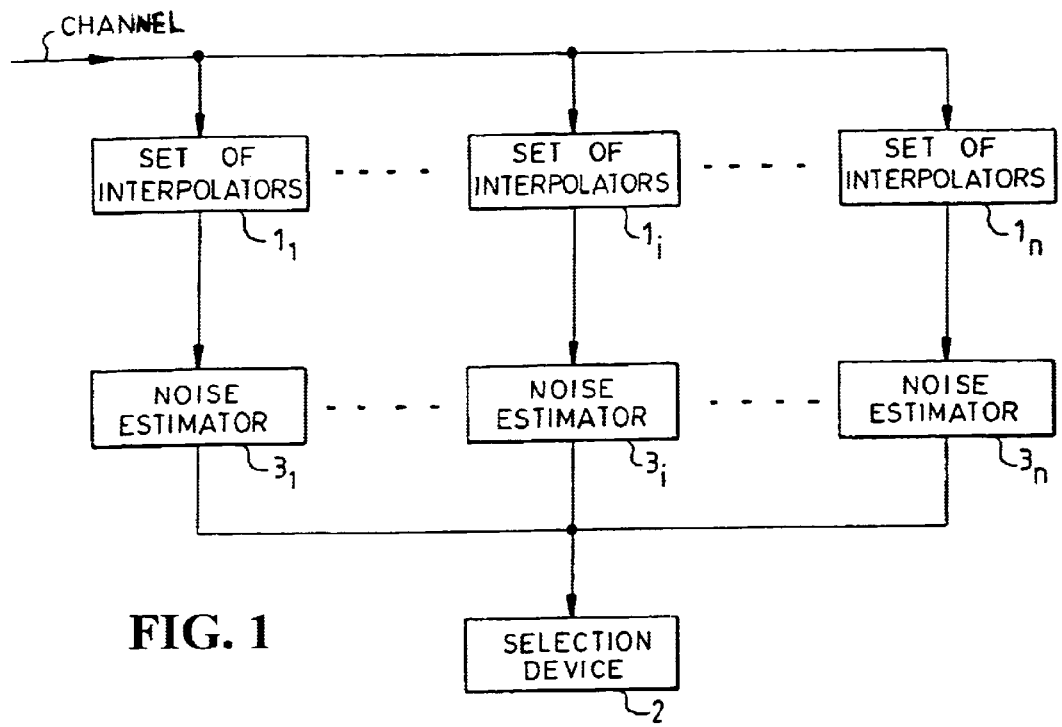
FIG. 1 shows a mode of organization of an interpolator system according to the invention.

To this end, the system shown in FIG. 1 comprises N sets of interpolators, referenced $1_1$ to $1_N$, to whose inputs the demodulated signals of a transmission channel are applied. The outputs of the sets of interpolators are coupled to a selection device 2 by means of N noise-estimating devices referenced $3_1$ to $3_n$.

Figure 3:
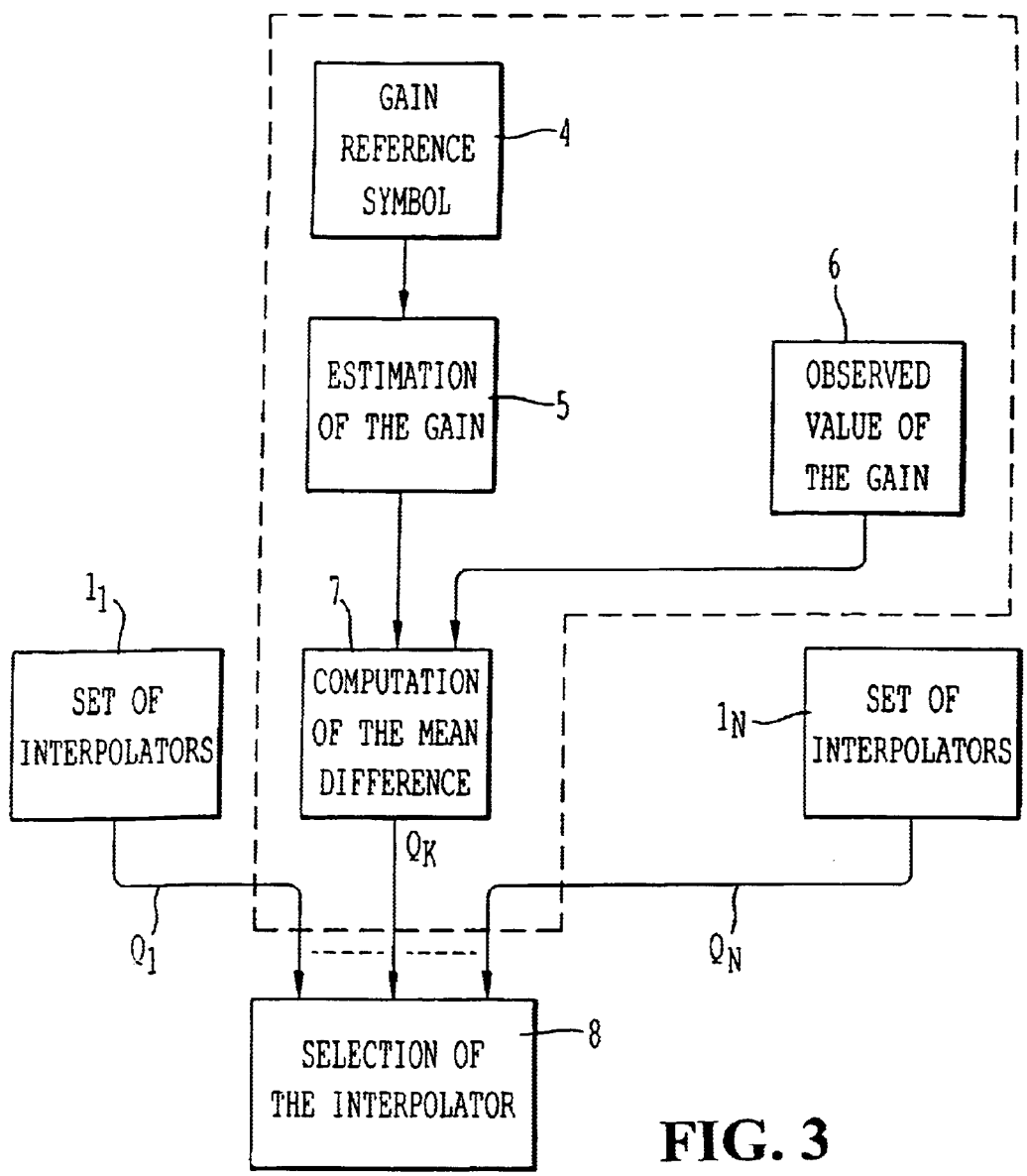
FIG. 3 shows various stages of the method according to the invention in the form of a flow chart.

The selection criterion entails making an assessment, at a given point in time, of the mean of the difference between the gain references and their values such as they are computed on the basis of the neighboring gain references. This computation is done by means of a special filter that is characteristic of the set of interpolators considered. As shown in the steps 4 to 8 of the flow chart of FIG. 3, it consists, at the step 5, for each symbol considered at the step 4 as a gain reference, in estimating this gain by filtering from itself and its neighbors, and, at the step 7, in computing the mean difference between the estimated value and the value of the gain observed at the step 6. The smaller the difference, the better will the set of interpolators used for computation be deemed to be. Since the computation is done on only one gain reference, and since these gain references represent only a small proportion of the transmitted symbols, the result is an almost negligible increase in the computing power required.

Figure 2:
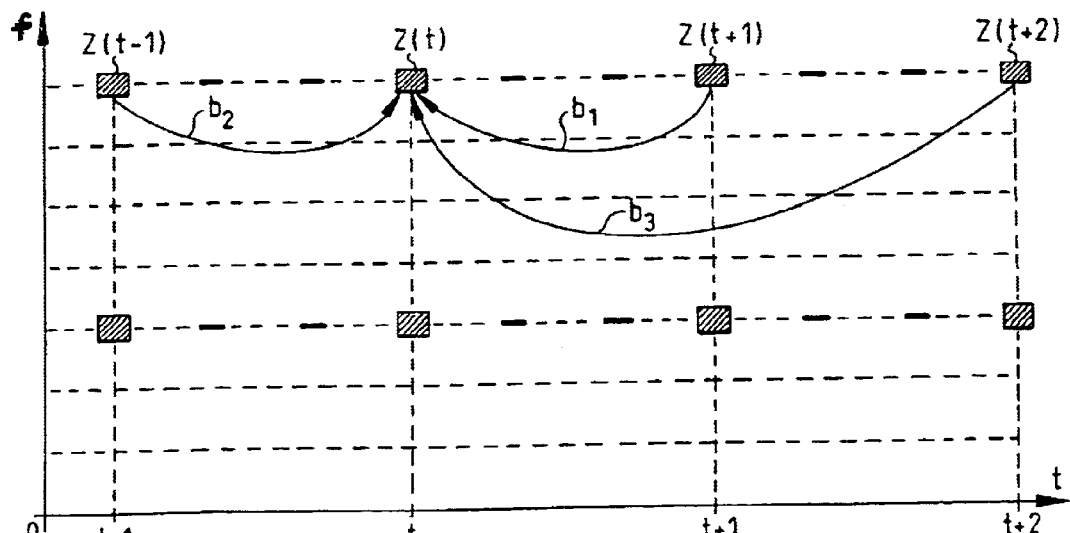
FIG. 2 shows a distribution of gain reference symbols on a transmission channel comprising several parallel-modulated carriers as well as an illustration of the mode of computation by interpolation that is carried out according to the invention.

To determine which is the best set of interpolators corresponding to the prevailing conditions, the method carries out an examination, on one or more carriers, of only those positions that correspond to known points in time t=... t-2, t-1, t, t+1, t+2 ... where the signal received r(t) has a known gain Z(t) determined for each of these points in time, as represented on FIG. 2. In this case the gain of the direct channel g(t) is determined by the relationship:

$$g(t) \; direct = \frac{r(t)}{z(t)}. \tag{1}$$

The indirect gain g(t) of the channel at a point in time t is obtained by interpolation in taking account of the direct gains of the channel at the different moments of reception of the signals that sandwich the point in time t according to the indirect relationship:

$$g(t)\ \text{indirect} = \sum_i b_{ik} \frac{r(t+dt(i))}{z(t+dt(i))} \qquad (2)$$

with $dt(i) \neq 0$ and where $b_{ik}$ designates coefficients adapted to the bandwidth corresponding to the variation of the channel.

The computation of the mean difference Q(k) is determined at the step 7 by the relationship:

$$Qk = <|g(t)\text{indirect} - g(t)\text{direct}|^2>_k \qquad (3)$$

The above computation is repeated for each set of interpolators. The set of interpolators selected in the step 8 is that for which the mathematical expectation $Q_k$ defined by the relationship (3) is the minimum and most usually appears in a specified time window.

Of course, given the randomness of the noise that is permanently present, a strategy of smoothing the decisions is carried out by the noise-estimating units 31 to 3$_n$ of FIG. 1. This strategy may consist, for example, in deciding that the new set of interpolators under examination is truly the right one when the criterion defined by the relationship (3) is the minimum for at least a specified number of times in succession during a specified number of successive symbols or, if this is not the case, in preserving the old set of interpolators. The set of interpolators is modified only by going to a neighboring set that corresponds to a slightly greater or slightly smaller temporal spread or corresponds to a slightly greater or slightly smaller frequency spread.

In practice, it proves to be the case that the system can be limited to a number equal to three sets of interpolators, one set of interpolators for conditions of low severity, i.e. conditions with low temporal spread with stable channel, one set of interpolators for the most severe conditions that the system can bear and one set of interpolators for conditions that are intermediate between these two extremes.

What is claimed is:

1. A system for estimation of complex gain of a transmission channel configured for parallel modulators/demodulators configured to be used in digital radio broadcasting, the system comprising:

a given number N of sets of interpolators configured to estimate the complex gain on a useful symbol from known symbols constituting gain references evenly positioned in a transmitted signal, each set of interpolators adapted to reception conditions, wherein the reception conditions can include a stable single-path channel to a channel with high temporal dispersion and high instability; and a selection device configured to receive outputs of said sets of interpolators, the selection device configured to choose the set of interpolators that gives a weakest estimated noise during a specified length of time.

2. A system according to claim 1, wherein the selection device is further configured to make an assessment at a given point in time and for each set of interpolators, of a mean difference between gain references and computed values based on neighboring gain references.

3. A system according to claim 2, wherein the selection device is further configured to select the set of interpolators for which the computed value of the mean difference between the gain references and their values computed from the neighboring gain references is minimal and most often appears during a given time window.

4. A system according to claim 1, wherein the known symbols constituting the gain references are distributed on one or more carriers of one and a same transmission channel.

5. A system for estimation of complex gain of a transmission channel configured for parallel modulators/demodulators configured to be used in digital radio broadcasting, the system comprising:

a given number N of sets of interpolator means for estimating the complex gain on a useful symbol from known symbols constituting gain references evenly positioned in a transmitted signal, each set of interpolator means adapted to reception conditions, wherein the reception conditions can include a stable single-path channel to a channel with high temporal dispersion and high instability; and selection means for receiving outputs of said sets of interpolator means and for choosing the set of interpolator means that gives a weakest estimated noise during a specified length of time.

6. A system according to claim 5, wherein the selection means further makes an assessment, at a given point in time and for each set of interpolator means, of a mean difference between gain references and computed values based on neighboring gain references.

7. A system according to claim 6, wherein the selection means further selects the set of interpolator means for which the computed value of the mean difference between the gain references and their values computed from the neighboring gain references is minimal and most often appears during a given time window.

8. A system according to claim 5, wherein the known symbols constituting the gain references are distributed on one or more carriers of one and a same transmission channel.

* * * * *